United States Patent
Bhan

(10) Patent No.: US 11,434,431 B2
(45) Date of Patent: Sep. 6, 2022

(54) CATALYST AND PROCESS FOR DEOXYGENATION AND CONVERSION OF BIO-DERIVED FEEDSTOCKS

(71) Applicant: SHELL OIL COMPANY, Houston, TX (US)

(72) Inventor: Opinder Kishan Bhan, Katy, TX (US)

(73) Assignee: SHELL USA, INC., Houston, TX (US)

( * ) Notice: Subject to any disclaimer, the term of this patent is extended or adjusted under 35 U.S.C. 154(b) by 320 days.

(21) Appl. No.: 14/886,150

(22) Filed: Oct. 19, 2015

(65) Prior Publication Data

US 2016/0108322 A1 Apr. 21, 2016

Related U.S. Application Data

(60) Provisional application No. 62/066,590, filed on Oct. 21, 2014.

(51) Int. Cl.
| | | |
|---|---|---|
| *C10G 3/00* | (2006.01) | |
| *B01J 23/28* | (2006.01) | |
| *B01J 35/10* | (2006.01) | |
| *B01J 37/02* | (2006.01) | |
| B01J 23/88 | (2006.01) | |
| B01J 37/08 | (2006.01) | |

(52) U.S. Cl.
CPC ............... *C10G 3/48* (2013.01); *B01J 23/28* (2013.01); *B01J 35/1019* (2013.01); *B01J 35/1061* (2013.01); *B01J 37/0201* (2013.01); *C10G 3/44* (2013.01); *B01J 23/88* (2013.01); *B01J 37/08* (2013.01); *C10G 2300/1014* (2013.01); *Y02P 30/20* (2015.11)

(58) Field of Classification Search
CPC .................................. C10G 3/48; C10G 3/44
See application file for complete search history.

(56) References Cited

U.S. PATENT DOCUMENTS

| 4,289,653 A | 9/1981 | Jaffe | |
| 4,499,197 A | 2/1985 | Seese et al. | |
| 4,780,446 A | 10/1988 | Nozemack et al. | |
| 4,837,193 A * | 6/1989 | Akizuki ................... B01J 23/85 | |
| | | | 208/112 |
| 4,988,659 A | 1/1991 | Pecoraro | |
| 6,872,685 B2 | 3/2005 | Timken | |
| 7,700,515 B2 | 4/2010 | Ackerman et al. | |
| 8,278,241 B2 | 10/2012 | Ackerman et al. | |
| 2008/0308458 A1 * | 12/2008 | Dindi ..................... B01J 23/755 | |
| | | | 208/137 |
| 2010/0076236 A1 * | 3/2010 | Van Heuzen ............. C10L 1/08 | |
| | | | 585/313 |
| 2010/0163458 A1 * | 7/2010 | Daudin .................... B01J 23/28 | |
| | | | 208/254 H |
| 2011/0073522 A1 * | 3/2011 | Bonduelle ................ B01J 21/12 | |
| | | | 208/57 |
| 2011/0166396 A1 | 7/2011 | Egeberg et al. | |
| 2011/0239532 A1 | 10/2011 | Baldiraghi et al. | |
| 2012/0048777 A1 * | 3/2012 | Derr ........................ B01J 21/12 | |
| | | | 208/120.01 |
| 2012/0198757 A1 * | 8/2012 | Koyama ................... C10G 3/50 | |
| | | | 44/307 |

FOREIGN PATENT DOCUMENTS

JP 2002233761 8/2002

OTHER PUBLICATIONS

Tiwari, Rashmi, et al.: "Hydrotreating and hydrocracking catalysts for processing of waste soya-oil and refinery-oil mixtures", Catalysts Communications, vol. 12, No. 6, Feb. 1, 2011 (Feb. 1, 2011), pp. 559-562, XP055253232.

* cited by examiner

*Primary Examiner* — Philip Y Louie
(74) *Attorney, Agent, or Firm* — Shell USA, Inc.

(57) ABSTRACT

A catalyst and process for the deoxygenation and conversion of bio-derived feedstocks. The catalyst comprises a silica-alumina support having specifically defined physical properties and a molybdenum component but a material absence of nickel. The process involves the processing of a bio-derived feedstock having an oxygen content to yield a conversion product having an exceptional distillation profile and physical properties and a substantially reduced oxygen content.

30 Claims, No Drawings

CATALYST AND PROCESS FOR DEOXYGENATION AND CONVERSION OF BIO-DERIVED FEEDSTOCKS

This present application claims the benefit of U.S. Patent Application No. 62/066,590 filed Oct. 21, 2014, the entire disclosure of which is incorporated herein by reference.

FIELD OF THE INVENTION

This invention relates to a catalyst and process for the deoxygenation and conversion of bio-derived feedstocks.

BACKGROUND OF THE INVENTION

In recent decades, for a variety of reasons, there has been increased interest in the development and use of biofuels as potential alternatives to fossil fuels. A biofuel is a fuel that is produced from material having a living source, such as plant-derived and animal-derived materials. These bio-derived materials from which the biofuels can be produced are generally animal fats and vegetable oils. Some examples of potential materials that can be processed as a bio-derived feedstock include plant-based fats and oils, such as, coconut oil, palm kernel oil, palm oil, cotton seed oil, olive oil, corn oil, soybean oil, peanut oil, flaxseed oil and any other plant or vegetable oil.

Many of the bio-derived materials having potential use as a feedstock material for the production of a biofuel comprise molecules having exceptionally high boiling temperatures making them unsuitable, without further processing and modification, for use in combustion engines. These bio-derived materials typically are made up of large percentages of saturated and unsaturated long-chain fatty acids. Thus, they are not only high boiling temperature materials, but they also contain, relative to fossil fuels, large percentages of oxygen due to the carboxyl and other oxygen-containing moieties of the fatty acids.

It is desirable to use a catalytic approach to processing the above-mentioned bio-derived materials to yield a variety of conversion products having lower boiling temperatures that allow for their use as one or more types of fuel. It also can be desirable or necessary to remove the oxygen from the bio-derived feedstocks before they or derivative products are used as a biofuel.

One problem with catalytic processing of bio-derived feedstocks having high oxygen content is that the oxygen is removed predominantly by way of a decarboxylation reaction instead by a deoxygenation reaction. The decarboxylation reaction involves, for example, removal of the carboxyl group (—COOH) from the fatty acid to yield carbon dioxide ($CO_2$) and a hydrocarbon (R—H); while, on the other hand, the deoxygenation reaction involves breaking the carbon-hydrogen bonds of the fatty acid molecule and replacing the broken bonds with hydrogen. The decarboxylation reaction can be incomplete and further can undesirably yield carbon monoxide instead of carbon dioxide.

U.S. Patent Pub. No. 2011/0166396 discloses a process and hydrodeoxygenation catalyst that provide for making diesel and naphtha fuels from feedstocks derived from renewable organic material and having oxygen-containing components. The hydrodeoxygenation catalyst that is disclosed in this publication is a supported molybdenum catalyst having a molybdenum content between 0.1 to 20 wt %, preferably, between 0.1 to 10 wt %, and without a co-promoter metal. The support is selected from alumina, silica, titania, and combinations thereof, but the support does not contain precipitated silica-alumina that contains a range of silica. Instead, the preferred support is an amorphous alumina. The support also has a bimodal structure with at least 2% of its total pore volume, preferably, at least 10%, and more preferably at least 15%, being within the pores having a diameter above 500 angstroms (macropores). The teachings of US 2011/0166396 are focused on an alumina support and the retention of large pores by using no or only a small amount of acid when preparing the alumina support of its catalyst. There is no mention in this publication of the mean pore diameter of its support or that there is any significance to its mean pore diameter other than it is important for the amorphous alumina support to have a significant pore volume in its macropores and it is bimodal.

As it has been shown, it is desirable to have a catalyst and process that provide for the processing of bio-derived feedstocks to yield conversion products having boiling temperatures in the gasoline and middle distillate boiling ranges, with low amounts of high-boiling temperature components, that suitably can be used as fuels in various combustion engines and other applications.

SUMMARY OF THE INVENTION

Accordingly, provided is a catalyst useful in the deoxygenation and conversion of bio-derived feedstocks. The catalyst comprises a support comprising a silica-alumina component impregnated with molybdenum, wherein the support has a mean pore diameter in the range of from 40 Å to 200 Å and a nitrogen surface area in the range of from 200 m2/g to 500 m2/g. The catalyst further comprises from 5 to 25 wt. % molybdenum, based on the total weight of the catalyst and the molybdenum as metal, regardless of its actual state, and it has a material absence of nickel.

In another embodiment of the inventive catalyst that is useful in the deoxygenation and conversion of bio-derived feedstocks, the catalyst consists essentially of a silica-alumina support component having from 2 to 15 wt. % of silica and from 85 wt. % to 98 wt. % alumina, a mean pore diameter in the range of from 40 Å to 200 Å, and a nitrogen surface area in the range of from 200 m2/g to 500 m2/g; and a molybdenum component present in an amount in the range of from 5 to 25 wt. % molybdenum, based on the total weight of the catalyst and the molybdenum as metal, regardless of its actual state.

In the inventive process for the deoxygenation and conversion of a bio-derived feedstock, having an oxygen content, the inventive catalyst is contacted with the bio-derived feedstock under suitable deoxygenation and conversion process conditions and a conversion product having a reduced oxygen content that is significantly reduced below the oxygen content of the bio-derived feedstock.

DETAILED DESCRIPTION OF THE INVENTION

As noted above, the bio-derived feedstocks of the inventive process have exceptionally high boiling temperatures and high oxygen contents that make them unsuitable for use as a fuel without further processing in order to crack the molecules to form smaller molecules and to remove oxygen from the bio-derived feedstock.

The bio-derived feedstocks of the inventive process generally comprise a significant proportion of compounds having high boiling temperatures exceeding 538° C. (1,000° F.). Typically, greater than 50 weight percent (wt. %) of the bio-derived feedstock processed by the inventive process are components that boil at a temperature greater than 538° C. (1,000° F.), and, in most cases, more than 60 wt. % of the bio-derived feedstock boils at a temperature greater than 538° C. (1,000° F.). More typically, however, greater than 75 wt. % of the bio-derived feedstock boils at a temperature greater than 538° C. (1,000° F.), and, most typically, the proportion of the bio-derived feedstock boils at a temperature greater than greater than 538° C. (1,000° F.).

A very small proportion, if any, of the bio-derived feedstock boils at a temperature below 343° C. (650° F.), and the portion of the bio-derived feedstock boiling below 343° C. (650° F.) is generally less than 10 wt. % and even less than 5 wt. % or less than 1 wt. %. The amount of the bio-derived feedstock that boils in the temperature range of from 343° C. (650° F.) to 538° C. (1,000° F.), however, can be upwardly to 50 wt. % of the bio-derived feedstock. But, typically, it is in the range of from 1 wt. % to 40 wt. %, more typically, it is in the range of from 5 wt. % to 30 wt. %, and, most typically, it is from 10 wt. % to 25 wt. %.

The bio-derived feedstock is further defined herein to be a material other than petroleum-based or hydrocarbons of a fossil or geological source. Rather, it is either a plant-derived material, such as a vegetable oil, or an animal-derived animal fat. Examples of potential plant-derived materials that may be suitable bio-derived feedstocks of the inventive process include those selected from the group consisting of coconut oil, palm kernel oil, palm oil, cotton seed oil, olive oil, corn oil, soybean oil, peanut oil, flaxseed oil and other vegetable oils.

Because of the sources of the bio-derived feedstock, it generally comprises a significant percentage or a substantial amount of fatty acid compounds the presence of which contribute to the high level of oxygen content, relative to fossil sourced hydrocarbons, due to the large presence of carboxyl moieties of the fatty acids. The fatty acid compounds of the bio-derived feedstock include long-chain fatty acid compounds having long aliphatic tails, and, typically, the long-chain fatty acid compounds have from 11 to 24 carbon atoms, more typically, from 12 to 22 carbon atoms, and, most typically, from 13 to 21 carbon atoms.

The bio-derived feedstock of the invention, thus, will contain at least 60 wt. % fatty acids (either saturated, or monounsaturated, or polyunsaturated, or any combination thereof). In most cases, however, the bio-derived feedstock comprises at least 75 wt. % fatty acids. More specifically, the percentage of the bio-derived feedstock that is fatty acids is at least 80 wt. %, or at least 85 wt. %, or at least 90 wt. %.

The oxygen content of the bio-derived feedstock exceeds 2 wt. % but usually is less than 25 wt. %. Therefore, the oxygen content is generally within the range of from 2 wt. % to 25 wt. % of the bio-derived feedstock. More typically, the oxygen content of the bio-derived feedstock of the inventive process exceeds 3 wt. % and is less than 20 wt. %. Most typically, the bio-derived feedstock has an oxygen content of greater than 5 wt. % and less than 15 wt. %.

The invention provides for catalytic processing of the bio-derived feedstock to yield a conversion product having a significantly reduced oxygen content relative to the oxygen content of the unprocessed bio-derived feedstock and a much more favorable distillation profile as compared to the distillation profile of the bio-derived feedstock as described in detail above. The catalyst composition of the invention provides for hydroconversion of the bio-derived feedstock to yield an unexpectedly exceptional conversion product having a very desirable distillation profile with a minimal amount of naphtha and light ends but with a major portion of conversion product being middle distillate boiling range material. The conversion product also has an unexpectedly low concentration of oxygen. Another of the unexpected results provided by the catalyst of the invention and its use is that the yield of carbon monoxide is extremely low thereby indicating a highly efficient conversion or deoxygenation of the oxygen-containing compounds of the bio-derived feedstock.

A critical feature of the catalyst composition of the invention is for the support to comprise, consist essentially of, or consist of a silica-alumina component. The silica-alumina component of the catalyst comprises silica and alumina constituents within specifically defined concentration ranges, as hereinafter more fully defined, but it is understood that the silica-alumina component of the support excludes a material amount of any mechanical mixture of alumina and silica or silica alone or alumina alone, and, instead, the silica-alumina component of the support of the catalyst of the invention is either a co-gel or a precipitate or a co-precipitate or a reaction product resulting from or formed by combining or mixing or reacting a silicon source with an aluminum source, or any other suitably prepared silica-alumina. Potential silica-alumina compositions that may be used as the silica-alumina component of the support and methods of making these silica-alumina compositions are described in a number of prior art patent references, including: U.S. Pat. Nos. 4,289,653, 4,499,197, 4,780,446, 4,988,659, 6,872,685, 7,700,515 and 8,278,241. These patents are incorporated herein by reference.

Thus, any suitable silica-alumina material known to those skilled in the art can be used as the silica-alumina component of the support of the inventive catalyst including silica-alumina materials that are commercially available provided that the silica-alumina material has the physical characteristics and properties as described herein. The silica-alumina of the support can be prepared by any of the methods known to those skilled in the art and including those described in the patents referenced above.

The silica-alumina may be prepared, for example, by precipitation of hydrous alumina onto amorphous silica hydrogel, or by reacting silica sol with an alumina sol, or by co-precipitation from a solution of sodium silicate and aluminum salt. But, an important distinction that is to be noted regarding the inventive catalyst over prior art catalysts useful in processing bio-derived feedstocks is that the silica-alumina material used in the preparation of the support of the inventive catalyst does not include, or excludes a material amount of, silica alone, and alumina alone, and mere mechanical mixtures of the individual components of silica and alumina.

The preferred silica-alumina material for use as a component of the support of the inventive catalyst is a precipitate or co-gel of silica-alumina that is yielded from a solution or a combination or mixtures of solutions comprising a silicate compound, such as an alkali metal silicate like sodium silicate, or comprising an aluminum salt, such as aluminum sulfate, sodium aluminate, and aluminum chloride, or comprising both a silicate compound and an aluminum salt. An especially desirable silica-alumina material for use in the support of the inventive catalyst is the silica-alumina composition made by the methods disclosed or claimed, or both, in U.S. Pat. No. 7,700,515 and in the patents cited therein, including U.S. Pat. Nos. 4,289,653, 4,499,197 and 4,988,659, and the silica-alumina composition disclosed or claimed, or both, in U.S. Pat. No. 8,278,241 and the aforementioned patents. As noted above, all of the disclosures and teachings of all of these patents are incorporated herein by reference.

It is theorized that the reason the inventive composition with its silica-alumina support, as opposed to a support that comprises predominantly alumina alone or predominantly silica alone or predominantly a combination of alumina and silica, performs differently is due to the silica and alumina of the silica-alumina material being embedded together as a result of the method by which it is made, e.g. by co-precipitation from a solution or combination of solutions of an alkali metal silicate and an aluminum salt. It is believed that the surface characteristics of the silica-alumina affect its surface acidity in such a way that the molybdenum atoms of the final catalyst composition bind to the surface of the silica-alumina support in a manner that is different from the way the molybdenum atoms bind to either alumina or silica.

The silica constituent of the silica-alumina component of the catalyst support is present in the silica-alumina in an amount in the range of from 2 to 15 wt. % and the alumina constituent of the silica-alumina component is present in an amount in the range of from 85 to 98 wt. %. It is preferred for the silica constituent of the silica-alumina to be present in an amount in the range of from 3 to 12 wt. %, and, more preferred, it is present in an amount in the range of from 4 to 10 wt. %. Regarding the alumina constituent of the silica-alumina, it is preferred that it is present in an amount in the range of from 88 to 97 wt. %, and, more preferred, it is present in the range of from 90 wt. % to 96 wt. %.

The silica-alumina starting material used to prepare the inventive catalyst can be in the form of a powder that is then mixed with water and, optionally, other components, such as a mineral acid, to help in the preparation of a mixture that can be formed into an aggregate or particle. The aggregate or particle can be in any suitable form known to those skilled in the art including extrudates, spheroids, pills or tablets, cylinders, irregular extrusions or merely loosely bound aggregates or clusters. The formed particle that is then calcined to provide the silica-alumina support of the catalyst comprises, consists essentially of, or consists of silica-alumina, water, and, optionally, a minor amount of one or more mixing or agglomeration aids.

The formed particle is then calcined in the presence of an oxygen-containing gas, such as air, under tightly controlled calcination temperature conditions in order to provide a support particle, comprising, consisting of, or consisting essentially of silica-alumina, and having the specifically defined properties that are believed to be critical to the performance of the catalyst in the conversion of the bio-derived feedstocks defined herein.

The minimum required temperature at which the formed particle is calcined is at least 704° C. (1,300° F.), but the calcination temperature should be controlled to provide the calcined support particle that exhibits Raman spectral characteristics such that its Raman spectrum has at least one Raman peak within the Raman region of from 1300 cm-1 to 1500 cm-1. These frequencies are given as Raman shifts abbreviated as cm-1 and are differential values between an excitation wavelength and a detected wavelength. The Raman spectrum is to be measured using any conventional laboratory Raman spectrometer under conditions that include: an excitation wavelength of 785 nanometers with 40 mW at the sample. The Raman spectrometer should be capable of a spectral resolution of less than 2 nm/mm.

Another important property of the silica-alumina support particle of the catalyst composition is for its mean pore diameter to fall within a narrow range of from 40 angstroms (Å) to 200 Å. The temperature at which the formed particle is calcined can be controlled to provide the silica-alumina support particle having the desired mean pore diameter within this narrow range. It is preferred for the mean pore diameter of the silica-alumina support to be with the range of from 50 Å to 150 Å and, more preferred, in the range of from 60 Å to 120 Å.

The silica-alumina support particle further should have nitrogen surface area in the range of from 200 to 500 m2/gram, preferably from 225 to 475 m2/gm, and, most preferably from 250 to 450 m2/gm.

The catalyst composition further comprises or consists essentially of or consists of a molybdenum component that is present in an amount in the range of from 5 wt. % to 25 wt. % with the wt. % being based on the total weight of the catalyst composition (i.e., the silica-alumina support plus the metal component) and the molybdenum as metal, regardless of the actual state of the molybdenum in the catalyst. In a preferred embodiment, the concentration of molybdenum in the catalyst is in the range of from 7 wt. % to 22 wt. %, and, more preferred, the concentration is in the range of from 10 wt. % to 20 wt. %.

The molybdenum is added to the silica-alumina support by any suitable metal impregnation method known to those skilled in the art. It is preferred to dissolve a salt of molybdenum, such as ammonium molybdate or molybdenum chloride or molybdenum dichloride dioxide, in water to form an aqueous impregnation solution of molybdenum that is incorporated into the silica-alumina support by filling its pores with the solution. This may be done by any known incipient wetness method of metal impregnation into a catalyst support. The impregnated support particle is then dried in air at a drying temperature in the range of from 75° C. to 250° C. and calcined at a calcination temperature in the range of from 450° C. (842° F.) to 900° C. (1652° F.).

An essential feature of the inventive catalyst is for it to have a material absence of a nickel component. One reason for this required material absence of nickel is the belief that nickel catalyzes the undesired decarboxylation reaction which not only yields carbon dioxide but also yields a certain amount of carbon monoxide. The presence of carbon monoxide can cause deactivation of the catalyst and the formation of nickel carbonyl compounds if the nickel is present in the catalyst with the molybdenum. What is meant herein by the phrase "a material absence of nickel" is that the catalyst composition may contain nickel, if any, in such concentration that it does not cause the formation of a material quantity of carbon monoxide when the catalyst is used in the catalytic processing of a bio-derived feedstock.

The material absence of nickel typically will mean that the catalyst composition optionally comprises less than 1 wt. % nickel, calculated as metal and based on the total weight of the catalyst, regardless of the actual state of the nickel. Preferably, the nickel is present in the catalyst at a concentration of less than 0.1 wt. %, and, more preferably, less than 0.05 wt. %.

In another embodiment of the inventive catalyst, it should further have a material absence of a cobalt component. What is meant by the phrase "a material absence of cobalt" is that the composition may contain cobalt, if any, at such a concentration that it does not materially affect the activity of the catalyst in favor of the decarboxylation reaction of the fatty acids of the bio-derived feedstock being catalytically processed with the catalyst. The material absence of cobalt typically will mean that the catalyst, optionally, comprises less than 1 wt. % cobalt, calculated as metal and based on the total weight of the catalyst, regardless of the actual state of the cobalt. Preferably, the cobalt is present in the catalyst at a concentration of less than 0.1 wt. %, and, more preferably, less than 0.05 wt. %. The process of the invention uses the inventive catalyst as described above in the processing of a bio-derived feedstock. This process provides a number of unexpected benefits in the processing of the bio-derived feedstock. For instance, it provides for the conversion of a major portion of the molecules of the bio-derived feedstock that boil at a temperature above 1,000° F. to molecules that boil at a temperature below 1,000° F. The conversion further is unexpectedly selective in that it yields an insignificant fraction of naphtha and light ends conversion products. Instead, the conversion products are concentrated in the middle distillate boiling range. It is also unexpected that the inventive process yields a conversion product having a significantly reduced concentration of oxygen over the amount of oxygen in the bio-derived feedstock being processed. And, regarding the yield of carbon monoxide, no significant or material amount of carbon monoxide is produced by the process.

In the process, the bio-derived feedstock having an oxygen content is contacted with the inventive catalyst under suitable deoxygenation and conversion process conditions to yield a conversion product having a reduced oxygen content that is significantly reduced below the oxygen content of the bio-derived feedstock.

The catalyst may be employed as a part of any suitable reactor system that provides for contacting the catalyst with the bio-derived feedstock under suitable deoxygenation and conversion process conditions that may include the presence of hydrogen and an elevated temperature and pressure. Such suitable reaction systems can include fixed bed systems, ebullating catalyst bed systems, slurried catalyst systems, and fluidized catalyst bed systems. The preferred reactor system is that which includes a fixed bed of the inventive catalyst contained within a reactor vessel equipped with a reactor feed inlet means, such as a feed nozzle, for introducing the bio-derived feedstock into the reactor vessel, and a reactor effluent outlet means, such as an effluent outlet nozzle, for withdrawing the reactor effluent or conversion product from the reactor vessel.

The deoxygenation and conversion process conditions are not particularly critical to the process other than they should be suitably adjusted as is necessary to provide a conversion product having the desired reduced oxygen content and distillation profile. In the preferred process, the bio-derived feedstock is contacted with the catalyst in the presence of hydrogen within a reaction zone defined by a reactor that contains the catalyst.

The reaction temperature within the reaction zone and at which the bio-derived feedstock is contacted with the catalyst is generally controlled within the range of from 400° F. to 1200° F. The preferred catalyst contacting temperature or reaction temperature is within the temperature range of from 450° F. to 1,000° F., and, more preferred, it is within the range of from 500° F. to 800° F.

The reaction pressure within the reaction zone and at which the bio-derived feedstock is contacted with the catalyst is generally controlled within the range of from 200 psig to 1200 psig. The preferred reaction pressure is in the range of from 400 psig to 1,100 psig and more preferred it is from 600 psig to 900 psig.

The flow rate at which the bio-derived feedstock is charged to the reaction zone of the inventive process is generally such as to provide a liquid hourly space velocity (LHSV) in the range of from 0.1 hr-1 to 10 hr-1. The term "liquid hourly space velocity", as used herein, means the numerical ratio of the rate at which the bio-derived feedstock is charged to the reaction zone of the inventive process in volume per hour divided by the volume of catalyst contained in the reaction zone to which the bio-derived feedstock is charged. The preferred LHSV is in the range of from 0.2 hr-1 to 8 hr-1, and more preferred, from 0.5 hr-1 to 5 hr-1.

It is preferred to contact the bio-derived feedstock with the catalyst of the invention in the presence of hydrogen. Having a presence of hydrogen can be important to the process in that significant cracking of the bio-derived feedstock takes place and hydrogen is added in place of the broken carbon bonds. Also, in the deoxygenation reactions, hydrogen is used to replace the carbon and oxygen bonds that are broken to remove oxygen from the fatty acids and other oxygen-containing molecules of the bio-derived feedstock.

Generally, the amount of hydrogen gas that is contacted with the catalyst, or introduced into the reaction zone, along with the bio-derived feedstock is in excess of the stoichiometric amount of hydrogen required for addition to the molecules due to the deoxygenation and cracking reactions. The hydrogen that is charged along with the bio-derived feedstock to the reaction zone of the process is sometimes referred to as hydrogen treat gas. The hydrogen treat gas rate is the amount of molecular hydrogen relative to the amount of bio-derived feedstock charged to the reaction zone and generally is in the range upwardly to 20,000 standard cubic feet (SCF at 1 atm and 60° F.) per barrel (42 US gallons) of bio-derived feedstock. It is preferred for the treat gas rate to be in the range of from 100 SCF/bbl to 10,000 SCF/bbl, and, more preferred, it is from 500 SCF/bbl to 5,000 SCF/bbl.

One of the unexpected benefits from the use of the inventive catalyst in the processing of the bio-derived feedstock is that a conversion product having very desirable characteristics is provided, among these characteristics is that the conversion product has significantly reduced oxygen content relative to the oxygen content of the bio-derived feedstock. While the reduced oxygen content of the conversion product of the process is generally less than 1 wt. %, the process can provide a much more significant reduction of the oxygen content of the bio-derived feedstock typically providing for a reduced oxygen content of the conversion product that is less than 0.5 wt. %. It is preferred, however, that the reduced oxygen content is less than 0.3 wt. %, and, more preferred, it is less than 0.2 wt. %.

Another unexpected feature of the inventive process is that it provides for an exceptionally large percentage conversion of the portion of the bio-derived feedstock boiling at the high boiling temperatures of above 538° C. (1,000° F.) to conversion products that boil at temperatures below 538° C. (1,000° F.). Not only is there an exceptionally high conversion of the high boiling temperature components of the bio-derived feedstock, but the conversion is also highly selective in that there is a very small proportion of the bio-derived feedstock that is converted to conversion products having the boiling temperatures in the naphtha and light ends boiling ranges. Moreover, the boiling temperatures of the conversion products are predominantly within the middle distillate boiling ranges.

The inventive catalyst and process, thus, provide for the conversion of the bio-derived feedstock such that at least 60 wt. % of its components, i.e., molecules, that boil at a temperature above 538° C. (1,000° F.) are converted to components that boil below 538° C. (1,000° F.). The process is capable of providing even a higher conversion of the bio-derived feedstock of at least 70 wt. %, and, in most cases, the conversion is at least 80 wt. %. And, as noted above, this conversion is highly selective in that there is very little conversion to naphtha and light ends. Essentially, greater than 90 wt. % of the converted components are to the middle distillate boiling ranges. The conversion product, thus, can comprise less than 10 wt. % components having boiling temperatures above 538° C. (1,000° F.), and, even less than 5 wt. % or less than 3 wt. % of these high boiling temperature components.

The following examples are presented to further illustrate the invention, but they are not to be construed as limited the scope of the invention.

Example 1

This Example describes the preparation of an inventive catalyst and a comparison catalyst that were used in their performance testing of Example 2 in the hydroprocessing of a bio-derived feedstock.

Two catalysts were prepared—a comparison catalyst and an inventive catalyst.

The comparison catalyst was prepared by impregnating a calcined support particle that comprised 100 percent alumina with 4 wt. % molybdenum (based the total weight of the catalyst and molybdenum as metal) followed by calcination of the impregnated support at a temperature of 900° F. The comparison catalyst contained molybdenum as the only catalytically active metal component, and there were no other co-promoter metals added to the catalyst. The comparison catalyst is representative of the catalyst disclosed in U.S. Patent Pub.

The inventive catalyst was prepared by impregnating a silica-alumina support particle (94 wt. % alumina/6 wt. % silica) that has been calcined under controlled calcination temperature conditions so that the calcined support exhibited certain Raman spectral characteristics with a molybdenum impregnation solution. The impregnation solution was an aqueous solution of ammonium molybdate. The impregnated calcined silica-alumina support particle was dried at a drying temperature of 125° F. followed by calcination at 750° F. The final catalyst composition contained 14.5 wt. % molybdenum (based the total weight of the catalyst and molybdenum as metal) and no other catalytically active or co-promoter metal components.

Example 2

This Example presents the results from the testing of the performance of the inventive catalyst and the comparison catalyst of Example 1.

Samples of each of the two catalysts described in Example 1 were tested for their performance in the catalytic processing of a 100% palm oil feedstock. Samples of each of the two catalysts were placed in separate trickle flow reactors that were operated under the process conditions listed in the following Table 1.

TABLE 1

| Reactor Conditions | Comparison Catalyst | Inventive Catalyst |
|---|---|---|
| Reactor Temperature (° F.) | 662 | 662 |
| Reactor Pressure (psig) | 725 | 725 |
| $H_2$ Gas Rate In (liter/hr) | 20 | 20 |
| $H_2$ Gas Rate Out (liter/hr) | 16.8 | 13.6 |
| LHSV | 2 | 2 |
| Gas Rate (SCF/bbl) | 5,500 | 5,500 |

The palm oil feedstock contained essentially no components boiling at a temperature of less than 650° F., but 17 wt. % of the palm oil components boiled at a temperature in the range of from 650 to 999.9° F. and 83 wt. % of the palm oil components boiled at a temperature of 1000° F. and higher. Presented in the following Table 2 is the distillation profile of the palm oil feedstock.

TABLE 2

| Recovered (Mass %) | Boiling Temperature (° F.) |
|---|---|
| 30 | 1099.2 |
| 40 | 1107.0 |
| 50 | 1113.0 |
| 60 | 1118.0 |
| 70 | 1123.2 |
| 80 | 1127.6 |
| 90 | 1131.2 |
| 95 | 1135.8 |
| FBP | 1211.8 |

Presented in the following Table 3 are certain other of the palm oil feedstock properties and properties of the conversion products resulting from the conversion reactions using the comparison catalyst and the inventive catalyst.

TABLE 3

| Property | Feedstock | Conversion Product (Comparison Catalyst) | Conversion Product (Inventive Catalyst) |
|---|---|---|---|
| Hydrogen (%) | 12.035 | 13.54 | 14.91 |
| Carbon (%) | 76.415 | 80.18 | 85.1 |
| Oxygen (%) | 11.10 | 7.35 | 0.16 |
| Nitrogen (ppm) | 12 | 77 | 4 |
| Sulfur (ppm) | 10 | 87 | 13 |
| Bromine No. | 22 | 25 | 6 |
| NMR Bromine No. | 44.8 | 23 | 5.5 |
| Density @ 70° F. (g/cm3) | 0.9159 | 0.8487 | 0.7861 |
| Viscosity @ 100° F. (cst) | 43.9 | 15.8 | 4.00 |
| Hydrodeoxygenation (%) | | 33.8 | 98.6 |
| Dewax Funct (pour point) | | 68.2 | 98.4 |
| Diesel Make (%) | | 34.8 | 88.8 |
| Bromine No. Reduction (%) | | −13.6 | 72.7 |
| NMR Br No. Reduction (%) | | 48.7 | 87.7 |
| HTSD Data | | | |
| IBP-360° F. | 0 | 0.50 | 0.30 |
| 360-650° F. | 0 | 34.80 | 88.80 |
| 650-999.9° F. | 17.00 | 38.30 | 9.70 |
| 1000° F. | 83.00 | 26.40 | 1.30 |

The performance results that are presented above show the numerous benefits that the inventive catalyst provides versus to the comparison catalyst in the conversion treatment of the bio-derived palm oil feedstock. A review of the distillation properties of the two conversion products shows that most all of the feedstock that boils within the temperature range of from 1000° F. and higher is converted using the inventive catalyst but the comparison catalyst fails to convert the same large proportion of the high boiling temperature components.

As may be seen from the presented data, the percentage of the conversion product of the invention that boils at a temperature of at least 1000° F. is only 1.30%, but the percentage of the conversion product of the comparison that boils within the same temperature range is 26.4%.

It is further recognized that the portion of the conversion product of the invention that boils in the middle distillate boiling range of from 360 to 650° F. is 88.8%, but the portion of the conversion product of the comparison that boils in the middle distillate boiling range is only 34.8%.

While every indicator that is presented in the above data demonstrates the superiority of the invention over the comparison, one property that requires specific mention is the oxygen contents of the conversion products. It is noted that the conversion product of the invention has an oxygen content that is only 0.16% with a substantial percentage of the oxygen content of the feedstock being removed. The percentage of oxygen content of the feedstock that is removed by the invention is substantially greater than the percentage that is removed by the comparison. This is demonstrated by the high percentage of hydrodeoxygenation of the feedstock that is accomplished by the invention versus that accomplished by the comparison with a 98.6% deoxygenation achieved with the invention but only a 33.8% deoxygenation being achieved with the comparison.

In addition to the above data, the composition of the offgases resulting from the use of the inventive catalyst in the conversion of the palm oil feedstock included a non-measurable concentration of carbon monoxide which indicates that the deoxygenation results in the formation of water and carbon dioxide instead of the undesirable carbon monoxide.

It will be apparent to one of ordinary skill in the art that many changes and modifications may be made to the described invention without departing from its spirit and scope as set forth herein.

The invention claimed is:

1. A process for deoxygenation and conversion of a bio-derived feedstock having an oxygen content, wherein said process comprises:
contacting said bio-derived feedstock under suitable deoxygenation and conversion process conditions with a catalyst comprising a silica-alumina support component impregnated with molybdenum, wherein said support has a mean pore diameter in the range of from 40 Å to 500 Å and a nitrogen surface area in the range of from 200 m$^2$/g to 500 m$^2$/g, and wherein said catalyst comprises from 5 to 25 wt. % molybdenum, based on the total weight of said catalyst and molybdenum as metal, regardless of its actual state, and wherein said catalyst has a material absence of nickel and cobalt; and
yielding a conversion product having a reduced oxygen content that is reduced below said oxygen content of said bio-derived feedstock.

2. A process as recited in claim 1, wherein said bio-derived feedstock comprises compounds having a boiling temperature exceeding 1,000° F., and wherein said oxygen content of said bio-derived feedstock is in the range of from 4 wt. % to 25 wt. % of said bio-derived feedstock.

3. A process as recited in claim 2, wherein at least 50 wt. % of said bio-derived feedstock has a boiling temperature above 1,000° F.

4. A process as recited in claim 3, wherein said bio-derived feedstock comprises at least 60 wt. % fatty acids.

5. A process as recited in claim 4, wherein said bio-derived feedstock comprises at least 75 wt. % fatty acid compounds.

6. A process as recited in claim 5, wherein said reduced oxygen content is less than 1 wt. % of said conversion product.

7. A process as recited in claim 1, wherein the silica-alumina support component comprises from 2 to 15 wt. % of silica and from 85 wt. % to 98 wt. % alumina.

8. A process, comprising:
contacting a bio-derived feedstock with a catalyst in the presence of hydrogen at a reaction temperature within the range of from 400° F. to 1200° F. and a liquid hourly space velocity (LHSV) in the range of from 0.1 hr$^{-1}$ to 10 hr$^{-1}$;
wherein said catalyst comprises:
a support, comprising a silica-alumina component that is a precipitate or co-gel having from 2 to 15 wt. % of silica and from 85 wt. % to 98 wt. % alumina, wherein said support has a mean pore diameter in the range of from 40 Å to 200 Å and a nitrogen surface area in the range of from 200 m$^2$/g to 500 m$^2$/g; and
a molybdenum component in an amount such that said catalyst comprises from 5 to 25 wt. % molybdenum, based on the total weight of said catalyst and said molybdenum as metal, regardless of its actual state, and wherein said catalyst has a material absence of nickel; and
yielding a conversion product having a reduced oxygen content that is reduced below an oxygen content of said bio-derived feedstock.

9. A process as recited in claim 8, wherein said support exhibits Raman spectral characteristics such that its Raman spectrum has at least one Raman peak within the Raman region of from 1300 cm$^{-1}$ to 1500 cm$^{-1}$.

10. A process as recited in claim 8, wherein said silica is from 3 to 12 wt. % of said silica-alumina component and said alumina is from 88 wt. % to 97 wt. % of said silica-alumina component.

11. A process as recited in claim 8, wherein said material absence of nickel is less than 3 wt. % nickel, based on the total weight of said catalyst and said nickel as metal.

12. A process as recited in claim 8, wherein said catalyst further has a material absence of cobalt, and wherein said material absence of cobalt is less than 3 wt. % cobalt, based on the total weight of said catalyst and said cobalt as metal.

13. A process as recited in claim 8, wherein said catalyst comprises from 10 to 20 wt. % molybdenum, and wherein said mean pore diameter of said support is in the range of from 60 Å to 120 Å, and wherein said nitrogen surface area 250 m$^2$/gm to 450 m$^2$/gm.

14. A process as recited in claim 8, wherein said bio-derived feedstock has an oxygen content exceeding 2 wt. % and less than 25 wt. % and said conversion product has a reduced oxygen content of less than 1 wt. %.

15. A process as recited in claim 14, wherein said bio-derived feedstock comprises high boiling temperature compounds having high boiling temperatures exceeding 1,000° F.

16. A process as recited in claim 15, wherein at least 60 wt. % of said high boiling temperature compounds are converted to lower boiling temperature compounds having lower boiling temperatures below 1,000° F.

17. A process as recited in claim 16, wherein said bio-derived feedstock contains at least 60 wt. % fatty acids.

18. A process as recited in claim 17, wherein said bio-derived feedstock comprises greater than 50 wt. % of said high boiling temperature compounds.

19. A process as recited in claim 18, wherein said conversion product comprises less than 10 wt. % converted components having boiling temperatures above 1,000° F.

20. A process, comprising:
contacting a bio-derived feedstock with a catalyst in the presence of hydrogen at a reaction temperature within the range of from 400° F. to 1200° F. and a liquid hourly space velocity (LHSV) in the range of from 0.1 hr$^{-1}$ to 10 hr$^{-1}$;
wherein said catalyst comprises:
a support, comprising a silica-alumina component that is a precipitate or co-gel having from 2 to 15 wt. % of silica and from 85 wt. % to 98 wt. % alumina, wherein said support has a mean pore diameter in the range of from 40 Å to 200 Å and a nitrogen surface area in the range of from 200 m²/g to 500 m²/g, and wherein said support exhibits Raman spectral characteristics such that its Raman spectrum has at least one Raman peak within the Raman region of from 1300 cm⁻¹ to 1500 cm⁻¹; and a molybdenum component in an amount such that said catalyst comprises from 5 to 25 wt. % molybdenum, based on the total weight of said catalyst and said molybdenum as metal, regardless of its actual state, and wherein said catalyst has a material absence of nickel; and yielding a conversion product.

21. A process as recited in claim 20, wherein said silica is from 3 to 12 wt. % of said silica-alumina component and said alumina is from 88 wt. % to 97 wt. % of said silica-alumina component.

22. A process as recited in claim 20, wherein said material absence of nickel is less than 3 wt. % nickel, based on the total weight of said catalyst and said nickel as metal.

23. A process as recited in claim 20, wherein said catalyst further has a material absence of cobalt, and wherein said material absence of cobalt is less than 3 wt. % cobalt, based on the total weight of said catalyst and said cobalt as metal.

24. A process as recited in claim 20, wherein said catalyst comprises from 10 to 20 wt. % molybdenum, and wherein said mean pore diameter of said support is in the range of from 60 Å to 120 Å, and wherein said nitrogen surface area 250 m²/gm to 450 m²/gm.

25. A process as recited in claim 20, wherein said bio-derived feedstock has an oxygen content exceeding 2 wt. % and less than 25 wt. % and said conversion product has a reduced oxygen content of less than 1 wt. %.

26. A process as recited in claim 25, wherein said bio-derived feedstock comprises high boiling temperature compounds having high boiling temperatures exceeding 1,000° F.

27. A process as recited in claim 26, wherein at least 60 wt. % of said high boiling temperature compounds are converted to lower boiling temperature compounds having lower boiling temperatures below 1,000° F.

28. A process as recited in claim 27, wherein said bio-derived feedstock contains at least 60 wt. % fatty acids.

29. A process as recited in claim 28, wherein said bio-derived feedstock comprises greater than 50 wt. % of said high boiling temperature compounds.

30. A process as recited in claim 29, wherein said conversion product comprises less than 10 wt. % converted components having boiling temperatures above 1,000° F.

\* \* \* \* \*